(12) United States Patent
Andreas (10) Patent No.: US 12,027,717 B2
(45) Date of Patent: Jul. 2, 2024

(54) CUSTOMIZABLE SUPPORT PAD FOR REDUCING VIBRATION AND GRAVITATIONAL SHOCK ACTING ON A BATTERY

(71) Applicant: Megaware KeelGuard Inc., Ogden, UT (US)

(72) Inventor: Thomas Steven Andreas, Versailles, MO (US)

(73) Assignee: MEGAWARE KEELGUARD REACQUISITION, LLC, Ogden, UT (US)

( * ) Notice: Subject to any disclaimer, the term of this patent is extended or adjusted under 35 U.S.C. 154(b) by 729 days.

(21) Appl. No.: 17/066,870

(22) Filed: Oct. 9, 2020

(65) Prior Publication Data

US 2021/0111387 A1   Apr. 15, 2021

Related U.S. Application Data

(60) Provisional application No. 62/913,540, filed on Oct. 10, 2019.

(51) Int. Cl.
*H01M 50/242* (2021.01)
*F16F 7/12* (2006.01)
*F16F 15/04* (2006.01)
*H01M 50/227* (2021.01)

(52) U.S. Cl.
CPC ........... *H01M 50/242* (2021.01); *F16F 7/121* (2013.01); *F16F 15/04* (2013.01); *H01M 50/227* (2021.01); *F16F 2224/025* (2013.01); *F16F 2226/00* (2013.01); *F16F 2234/06* (2013.01); *H01M 2220/20* (2013.01)

(58) Field of Classification Search
CPC .............................. H01M 50/242; F16F 7/121
See application file for complete search history.

(56) References Cited

U.S. PATENT DOCUMENTS

| | | | |
|---|---|---|---|
| 3,026,224 A * | 3/1962 | Rogers, Jr. ............. | F16F 1/376 428/167 |
| 3,459,400 A * | 8/1969 | Rothermel ............ | F16F 1/3737 248/636 |
| 9,276,243 B2 | 3/2016 | Templeman et al. | |
| 9,543,558 B2 | 1/2017 | Templeman et al. | |
| 9,899,648 B2 | 2/2018 | Templeman et al. | |
| 9,954,206 B2 | 4/2018 | Templeman et al. | |

(Continued)

FOREIGN PATENT DOCUMENTS

| | | | | |
|---|---|---|---|---|
| AU | 2015264791 A1 * | 1/2017 | ......... | A63B 21/4037 |
| JP | 6159036 B1 * | 7/2017 | ............ | A43B 13/04 |
| KR | 2019910023958 | 3/1997 | | |

*Primary Examiner* — Melanie Torres Williams
(74) *Attorney, Agent, or Firm* — PIERCE IP LAW, PLLC (57) ABSTRACT

This invention relates to a support pad formed of a shock absorbing material capable of absorbing energy resulting from vibration and gravitational forces acting on a battery disposed in engagement with the support pad and, correspondingly, transferring gravitational forces that occur along a z-axis resulting from up and down movement of the battery and dispersing these gravitation forces along an x-axis, a y-axis and the z-axis so as to reduce the impact shock on the battery by between about 65% to about 80% and, in doing so, prolonging the performance and life-cycle of the battery.

6 Claims, 7 Drawing Sheets

(56) References Cited

U.S. PATENT DOCUMENTS

| | | | |
|---|---|---|---|
| 10,128,475 B2 | 11/2018 | Templeman et al. | |
| 2002/0018877 A1* | 2/2002 | Woodall | B32B 3/30 |
| | | | 428/180 |
| 2005/0199668 A1* | 9/2005 | Wheatley | B60R 11/00 |
| | | | 224/483 |
| 2006/0121250 A1* | 6/2006 | Wheatley | B60R 11/02 |
| | | | 428/40.1 |
| 2006/0163440 A1* | 7/2006 | Williams | F16F 1/376 |
| | | | 248/560 |
| 2007/0026304 A1 | 2/2007 | Jeon et al. | |
| 2009/0239136 A1 | 9/2009 | Nagamine et al. | |

\* cited by examiner

CUSTOMIZABLE SUPPORT PAD FOR REDUCING VIBRATION AND GRAVITATIONAL SHOCK ACTING ON A BATTERY

RELATED APPLICATION

This application claims the benefit of U.S. Provisional Patent Application Ser. No. 62/913,540, filed on Oct. 10, 2019 and entitled "NOVEL CUSTOMIZABLE BATTERY PAD FOR REDUCING VIBRATION AND GRAVITATION SHOCK."

BACKGROUND

1. The Field of the Invention

The present invention relates to a support pad for a battery and, more specifically, to a support pad formed of a shock absorbing material capable of absorbing energy from vibration and gravitational shock applied against a battery and transferring the gravitational force along a z-axis of the shock absorbing material resulting from up and down movement of the battery and dispersing the gravitation force through the shock absorbing material along an x-axis and a y-axis thereby reducing the impact shock on the battery and considerably extending the life cycle of the battery.

2. The Background Art

Vehicles that are designed for the road or the water today generally incorporate a variety of electronic components. For example, a simple fishing boat may have multiple digital displays, transducers, LED lights and electric trolling motors. Many off-road Jeeps and ATV owners accessorize their vehicles with light bars, extensive stereo systems, electronic winches, air compressors and the like. The addition of these electronically supported accessories and components often require two or more batteries to be positioned within the body of vehicle or the boat or other marine vessel. It is also common to find small fishing boats or even ski boats that use 4-5 deep-cycle batteries to operate its electronics. The cost of these types of batteries, as readily appreciated by those in the art, are typically very expensive.

Automobiles, trucks and/or marine vehicles may be subjected to extreme conditions associated with significant vibrational and gravitational forces that act not only on the vehicle, but on the battery or batteries that power these vehicles. Some of these extreme conditions may include, for example and not by way of limitation, rough trails, potholes and large sustaining waves. Whereas, when a battery is subjected to extreme vibration and gravitational shock, cracks may occur at the interface of mechanical joints inside the battery and its cells. While some batteries are designed to withstand these gravitational forces better than others, over time all batteries sustain internal damage by the shock and vibrational forces acting on it. Battery failure will often be preceded by performance fading. This is because the stress of the shock and vibrational forces acting on the battery results in micro-fractures inside the battery which reduces internal conductivity and effectively causes the battery to have a reduced or low voltage output.

Over time, as the micro-fractures continue to propagate in the battery's conductive components, internal electrical resistance increases. This condition generally reduces the flow of amps which are required to power the intended electrical components and accessories of the vehicle. As further appreciated, another cause of performance fading is the physical collision of battery plates as a result of the vibration and gravitational forces physically acting on the battery. This condition of the collision of battery plates usually results in one or more short-circuits in one or more cells of the battery causing the battery to generate a low voltage and insufficient power to support the intended electrical components or accessories.

Many battery trays and boxes of the prior art designed to hold one or more batteries in place do not fully prevent moment of the battery within the tray or battery box. As a result of failing to restrict enough movement of one or more batteries placed in the battery tray or box, the prior art battery holders do not offer sufficient protection against vibration or impact shock.

In an effort to limit the shock and vibrational forces that typically act on a battery, those skilled in the art designed battery modules of vibrational dampening structures. For example, U.S. Patent Application Publication No. 20150037662 discloses a battery module that includes an active material disposed in layers to form a generally planar electrochemical cell with an upper surface, a lower surface and side surfaces. The battery also includes electrodes extending out of the electrochemical cell, and a frame disposed about the active material such that edges of the frame surround the side surfaces of the active material and the electrodes extend beyond the frame. The battery further includes an upper layer of pouch material disposed over the upper surface of the active material and an upper surface of the frame, and a lower layer of pouch material disposed over the lower surface of the active material and a lower surface of the frame. The upper layer of pouch material and the lower layer of pouch material function to provide a seal that seals the active material within the frame.

Another example is disclosed in Chinese Patent No. 211441937 teaches a vibration damping structure for a battery box, which includes a vehicle-mounted collet frame arranged on a heavy truck and a battery box frame arranged on the battery box. A buffer cushion is laid on the upper surface of the vehicle-mounted collet frame. Though the patent overcomes some of the problems of the prior art by providing the buffer cushion positioned on the horizontal contact surface between the vehicle-mounted collet frame and the battery box frame, the vibrational and shock impact of the gravitational force can not be overcome completely.

A lot of battery isolation cases have been developed by those skilled in the art over the years, but these isolation cases can often cost as much as a new battery if not more. To this end, many people cannot justify the large expense. Moreover, some of the battery isolation cases of the prior art are bulky causing them to be difficult to install or unusable in tight spaces such as in the battery compartment of a boat or an engine bay or battery compartments on a recreational vehicle. These battery isolation cases or boxes are also not typically formed to be adjustable so as to provide an ability to be customizable to fit multiple battery sizes. Presently, there is no easy and affordable way that protects one or more batteries from sustained vibrational shock and gravitational forces.

In order to overcome the shortcomings of the prior art battery modules and containment boxes and trays, there is a need to provide a more durable and cost effective support pad to better isolate the vibration and gravitation forces acting on a battery. There is an additional need in the art for a support pad that overcomes or significantly mitigates the vibrational shock and gravitational forces acting on a batter and which overcomes before mentioned shortcomings of the devices of the prior art.

The support pad of the present invention provides the user with an easy to use, cost effective and reliable way of protecting their batteries. Many battery trays and boxes designed to hold a battery in place do not fully prevent moment of the battery within the tray or box and they offer no protection against impact shock. The use of the present support pad alone or in concert with one of the battery modules, trays or boxes of the prior art will significantly result in a reduction in the movement of the battery when placed into the holder and reduce vibrational forces and gravitational force caused from impact shock acting on the battery.

SUMMARY AND OBJECTS OF THE INVENTION

In view of the foregoing, it is a primary object of the present invention to provide a support pad formed of a shock absorbing material capable of absorbing energy from vibrational and gravitational forces and thereby reduce the impact shock acting on a battery and, in doing so, prolonging the performance and life-cycle of the battery.

It is a further object of the present invention to provide a support pad formed of a shock absorbing material capable of absorbing energy from vibration and gravitational forces applied to a battery and, correspondingly, transferring these vibration and gravitational forces that occurs along a z-axis resulting from up and down movement of the battery and dispersing the gravitation forces along an x-axis, a y-axis and the z-axis so as to reduce the impact shock by between about 65% to about 80%, thereby considerably extending the life-cycle of the battery as a result thereof.

It is a still further object of the present invention to provide a support pad comprising a shock absorbing material made of an elastomer and, preferably, a plastisol.

Additionally, it is an object of the present invention to provide a support pad formed of a shock absorbing material having a raised grid pattern that extends upward from a base member having a surface area sufficient to engage at least a portion of a battery.

It is a further object of the present invention to provide a support pad formed of a shock absorbing material providing a gripping function sufficient to restrict and/or reduce sliding of a battery when placed thereon.

It is also an object of the present invention to provide a support pad formed of a shock absorbing material having a raised grid pattern that facilitates ease of cutting the support pad into different sizes sufficient to engage the size of the particular battery.

It is a still further object of the present invention to provide a method of manufacturing the support pad which includes the steps of collecting an elastomer material, melting the elastomer material at a temperature sufficient to liquify the elastomer material, introducing the liquified elastomer material into a mold of a support pad and removing the support pad from the mold after curing.

Additionally, it is another object of the present invention to provide a method of manufacturing the support pad comprising the steps of collecting scraps of fishing lures made of an elastomer material, sorting colors and durometers of the fishing lure scraps, mixing the fishing lure scraps with a virgin or raw elastomer material at a 7:1 ratio to form a mixture, grounding and heating the mixture at a temperature sufficient to liquify the mixture, introducing the liquified mixture into a reservoir, introducing, by means of injection or pouring, the mixture from the reservoir into a mold, cooling the mold to form the support pad and removing the support pad from the mold.

It is a still further object of the present invention to provide a support pad that can be placed into a battery box, on a tray or a shelf to provide an support pad having elastomer properties between the base of the battery box, tray or shelf and the bottom end of the battery sufficient to absorb vibrational shock and gravitational forces acting against the battery.

Other objectives and aspects of the invention will become apparent from the following detailed description, taken in conjunction with the accompanying drawings, which illustrate, by way of example, the features in accordance with embodiments of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

Although the invention is described above in terms and various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being part of a described embodiment. Thus, the breadth and scope of the present invention should not be limited by any of the above-described exemplary embodiments.

BRIEF DESCRIPTION OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawing in which:

DETAILED DESCRIPTION OF EMBODIMENTS

It will be readily understood that the components of the present invention, as generally described herein, could be modified, arranged and designed in a wide variety of different formulas. Thus, the following more detailed description of the embodiments of the composition and systems and methods of the present invention is not intended to limit the scope of the invention. The scope of the invention is as broad as claimed herein.

Figure 1:
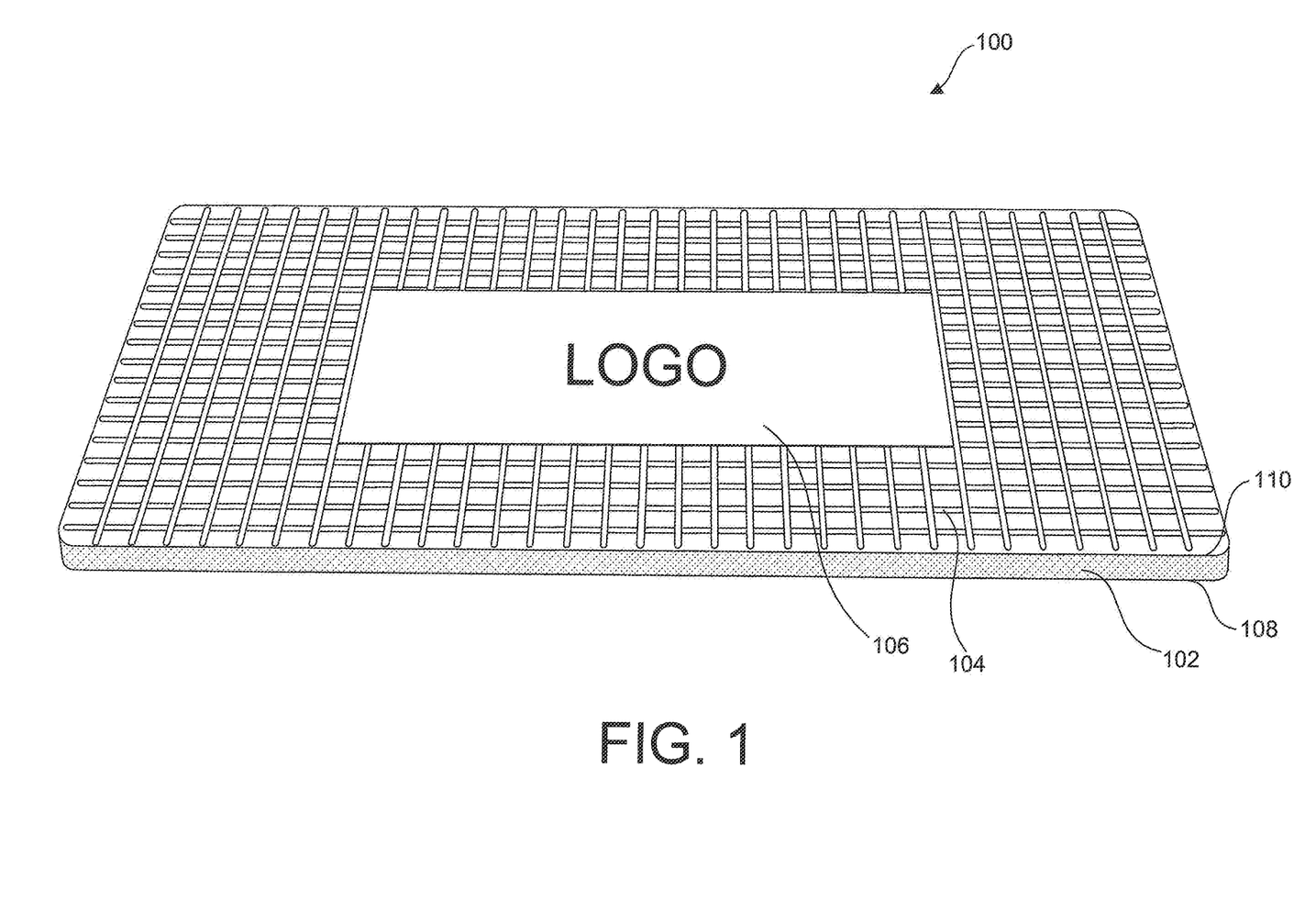
FIG. 1 is a perspective view of one embodiment of a support pad in accordance with the present invention.

Referring to FIG. 1, a support pad 100 in accordance with one embodiment of the present invention is formed of a shock absorbing material capable of reducing vibration and gravitational forces acting on a battery. The support pad 100 includes a thickness 102 disposed between a bottom surface 108 and an upper surface 110. The upper surface 110 of the support pad 100 having a surface area sufficient to engage at least a portion of a lower end of a battery.

The shock absorbing material comprising the support pad is formed of an elastomer. In one embodiment of the present invention, the elastomer is a plastisol. The elastomer comprising the support pad 100 may include a certain percentage of plastisol collected from soft fishing lure scraps sorted by color and durometers which are mixed with a raw or virgin elastomer material at about a 7:1 ratio.

It is important to note that a fundamental feature and surprising characteristic of the present invention is the composition of the shock absorbing material and its capacity to absorb energy from an impact shock applied against a battery supported thereon, transferring a gravitational force that occurs along a z-axis resulting from up and down movement and dispersing the gravitation force along an x-axis and a y-axis to correspondingly reduce the impact shock acting on the battery and, in doing so, prolong the performance and life-cycle of the battery. For example, battery failure can happen when the thin lead plates in the battery develop micro-fractures as a result of vibration and gravitation forces acting on the battery over time. Once fractured, the plates rapidly degrade until total failure occurs. These vibrational shocks and gravitational forces generally happen on uneven roads having potholes and bumpy and uneven trails being traversed by vehicles, but more commonly materialize on the water when boats go through waves.

These impact gravitational shocks created by the force of waves on boat can be best understood through an example of 1G referring to gravity. At 1G, a 75-pound battery has 75 lbs of pressure, but an 8-inch drop is the equivalent of 8 times the force. This equates to 600 lbs of pressure. Boats frequently reach 8G while driving through waves and rough seas usually exceed 8G, thus adequate support or padding is required for protecting the battery(ies). In one embodiment of the support pad 100 of the present invention and based on the characteristics of the shock absorbing material can reduce the effect of 8G forces to 1.6G forces that are acting on the battery engageably positioned in relationship to the support pad. To this end, the support pad 100 of the present invention reduces up to between about 65% and about 80% of the gravitational shock caused by excessive shock and vibration acting on a battery.

A grid pattern 104 extends substantially upward from at least a portion of the upper surface 110 of the support pad 100. As illustrated in FIG. 1, the grid pattern 104 of one embodiment of the present invention is formed along the entire portion of the upper surface 110 of the support pad 100. In function, shock absorbing material comprising the support pad 100 in cooperation with the grid pattern 104 are designed to assist in resisting or reducing slippage of a battery when placed in supportable engagement with the support pad 100.

In one embodiment of the present invention, the grid pattern 104 formed on at least a portion of the upper surface 110 of the support pad 100 provides a pattern for cutting the support pad to a size that fits within a battery box, tray or shelf. In one embodiment of the support pad 100 of the present invention, the dimensions of the support pad may include, by way of example and not by limitation, 12¾"× 6⅞"×⅜." Of course, the size and shape of the support pad 100 should be complimentary in size to engage at least a portion of the lower surface of a particular battery being positioned in engagement therewith. Should the size of the battery exceed the standard size of the support pad, additional support pads can be used and, if necessary, resized to cover the bottom surface of the battery. The standard size of the support pad is formed to fit Group 31 batteries. If a need arises to fit a larger battery, additional support pads may be used in combination.

If desired, a logo surface 106 may be formed in at least a portion of the upper surface 110 of the support pad 100. In one embodiment of the present invention, a business logo or a product name may be introduced in at least a portion of the logo surface 106 of the support pad.

Figure 2A:
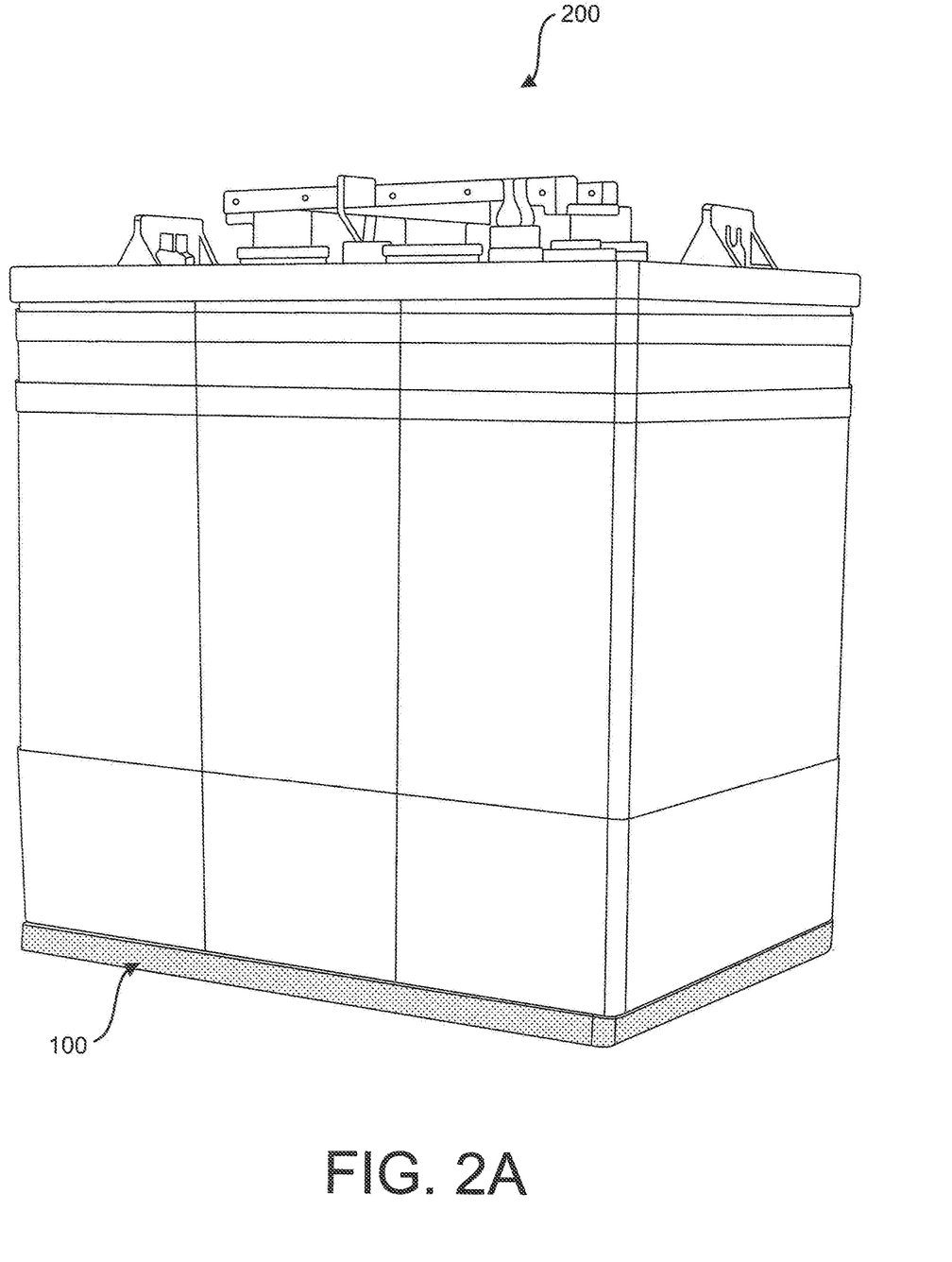
FIG. 2A is a perspective view of one embodiment of a support pad in accordance with the present invention positioned beneath the bottom surface of a battery.

Referring now to FIG. 2A, a support pad 100 of one embodiment of the present invention is positioned in engagement with the lower surface 201 of a battery 200 for absorbing vibration and gravitational shocks. In function, the shock absorbing material that forms the support pad 100 greatly reduces impact shock that may be exerted on the battery 200 and endeavors to protect the vulnerable internal components of the battery. The example shown depicts a standard flooded lead acid battery, however the support pad 100 can be used on other battery types including but not limited to, Absorbent Glass Mat (AGM), spiral cell, gel, lithium ion batteries or the like.

Figure 2B:
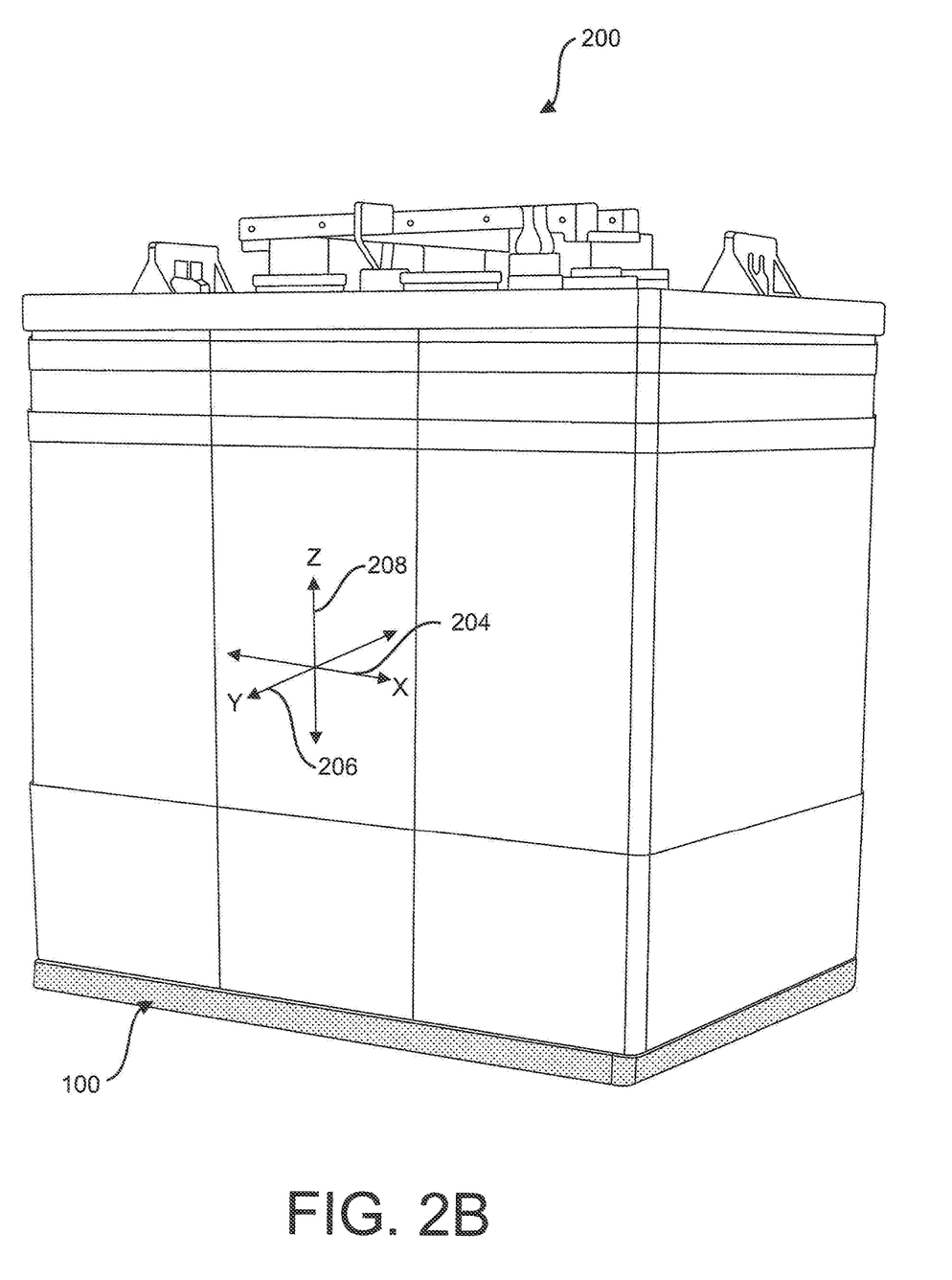
FIG. 2B is a perspective view of one embodiment of a support pad in accordance with the present invention positioned beneath the bottom surface of a battery and illustrating the directional forces in a z-axis, x-axis and y-axis that may be found to act on the battery.

FIG. 2B illustrates the direction of forces acting on a battery 200 positioned to engage the support pad 100. In function, the support pad 100 is formed of a shock absorbing material capable of absorbing energy from an impact shock applied against a battery 200, transferring a gravitational force occurring along a z-axis 208 as a result of up and down movement resulting in compression and dispersing said gravitational force along an x-axis 204, a y-axis 206 and the z-axis 208 to reduce the impact shock. The characteristics of the shock absorbing material of the support pad 100 surprisingly and unexpectedly distributes the impact shock and gravitational forces throughout the x-, y- and z-axis. Thus, the one embodiment of the support pad 100 of the present invention protects the battery disposed in engagement therewith when traveling on the road, trails or across water. The arrows marked in FIG. 2B depict the distribution of energy along x-axis (204), y-axis (206) and z-axis (208) through compression.

Figure 3A:
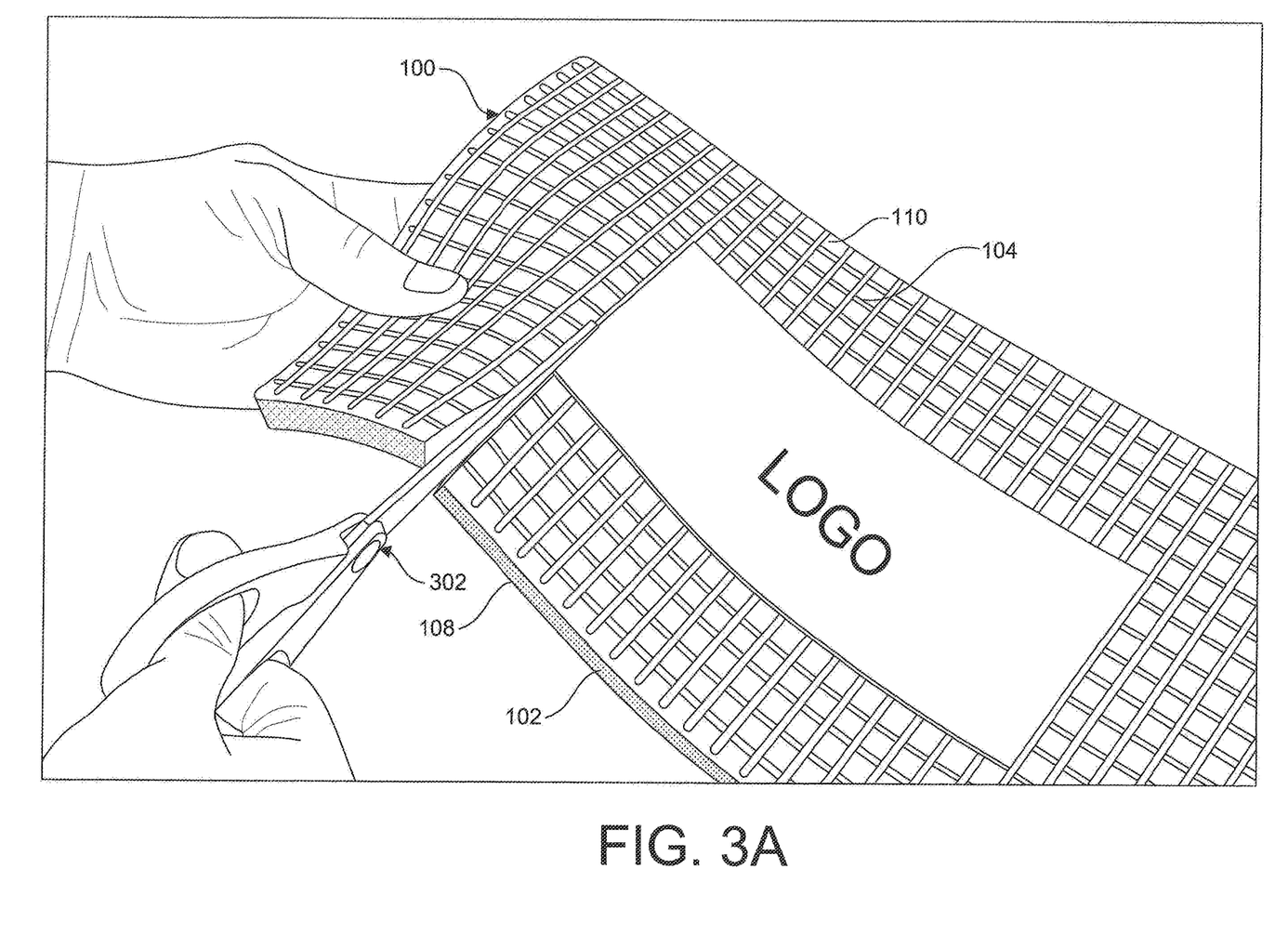
FIG. 3A is a perspective view of one embodiment of a support pad in accordance with the present invention showing a technique for cutting a portion of the support pad to fit beneath the surface area of a battery or into the bottom surface of a battery box or the upper surface of a tray or support shelf.

Referring now to FIG. 3A, a support pad 100 of one embodiment of the present invention comprises a grid pattern 104 formed in at least a portion of the upper surface 110. The grid pattern 104 may provide a guide in cutting or trimming the support pad into smaller sizes using a cutting tool 302. In one embodiment, the grid pattern 104 may comprise raised or indented lines or may include other marking methods to aid in adjusting the size and shape of the support pad 100, as needed.

Figure 3B:
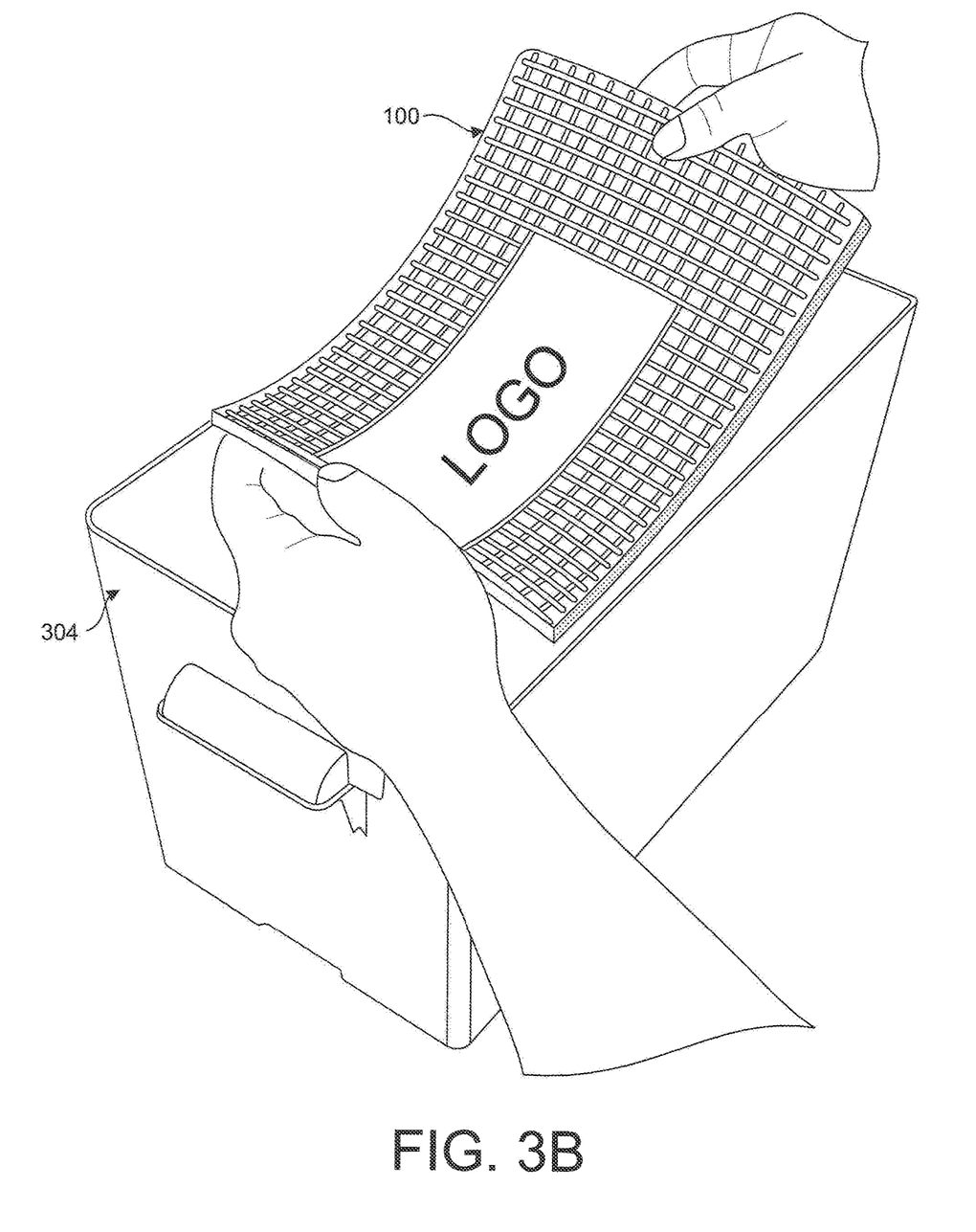
FIG. 3B is a perspective view of one embodiment of a support pad in accordance with the present invention illustrating the introduction of the support pad having an altered length into a battery box.
Figure 3C:
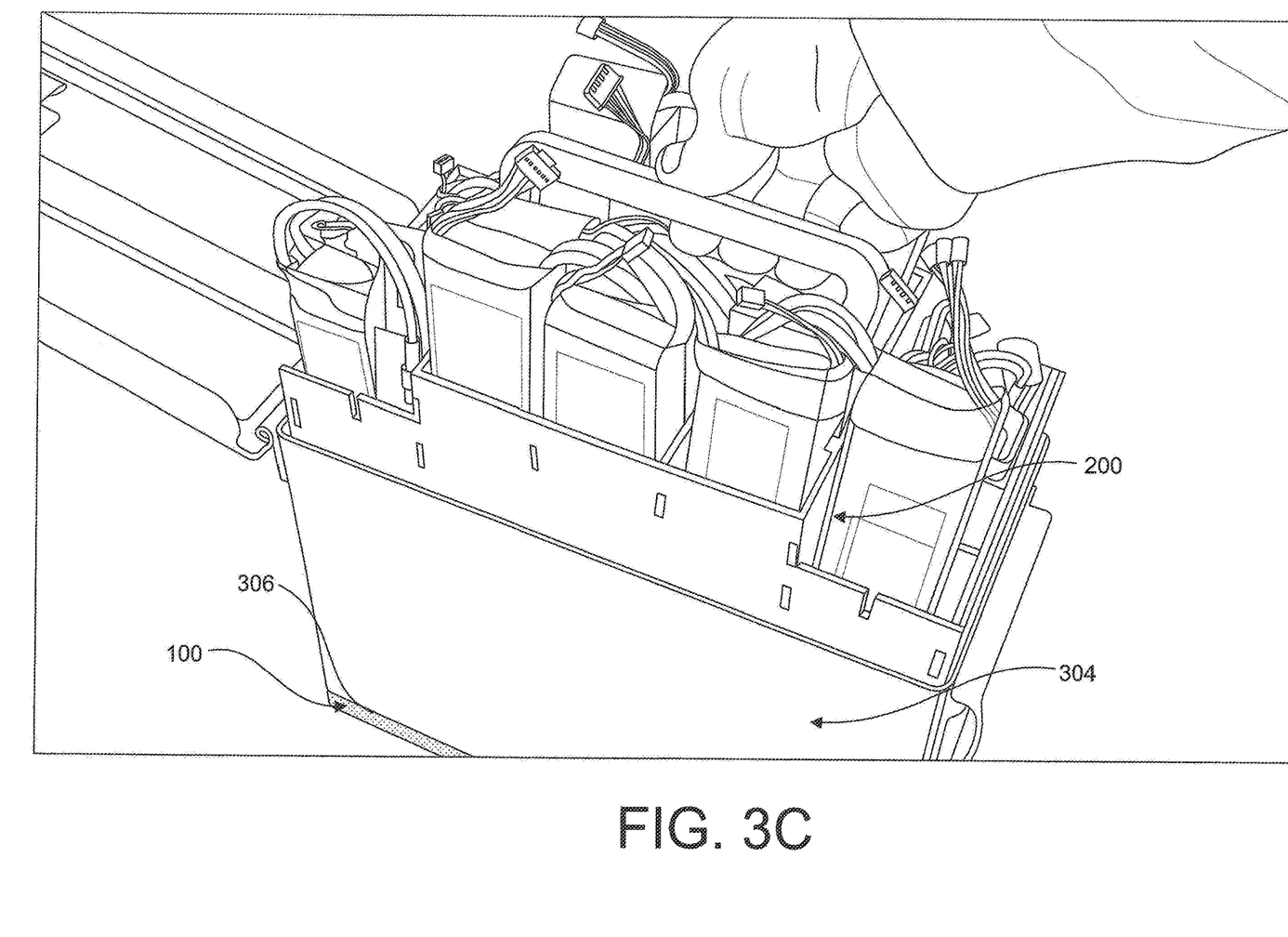
FIG. 3C is a perspective view of one embodiment of a support pad in accordance with the present invention illustrating the introduction of a battery into a battery box having a support pad positioned along the bottom surface of the battery box.

FIG. 3B illustrates one embodiment of a placement of a support pad in a battery box 304. As taught herein, the support pad 100 may be introduced into a battery box, positioned in engagement with a battery box, tray, compartment, shelf or any other location that a battery may be positioned in relation to the support pad in an automotive or marine vehicle. As noted above, the support pad 100 of an embodiment of the present invention may also be cut into one or more customized sizes and shapes so as to fit snugly within the battery box, tray, compartment, shelf or any other location where a battery is engageably positioned in supportable relation to the support pad.

Referring to FIG. 3B, a support pad 100 of one embodiment of the present invention may be supportably positioned beneath the bottom exterior surface 306 of a battery box 304. As appreciated, the battery 200 is typically restrained in the battery box 304 by adjustable straps (not shown) to keep the battery sufficiently immobilized when positioned within the battery box. Alternatively, the battery box 304 may be supportably positioned on the grid pattern 104 extending outward from the upper surface 110 of the support pad 100 and mechanically restrained in corresponding relationship by adjustable straps that keep the battery box having the battery 200 positioned therein sufficiently immobilized in a supportable engagement with the support pad.

Figure 4:
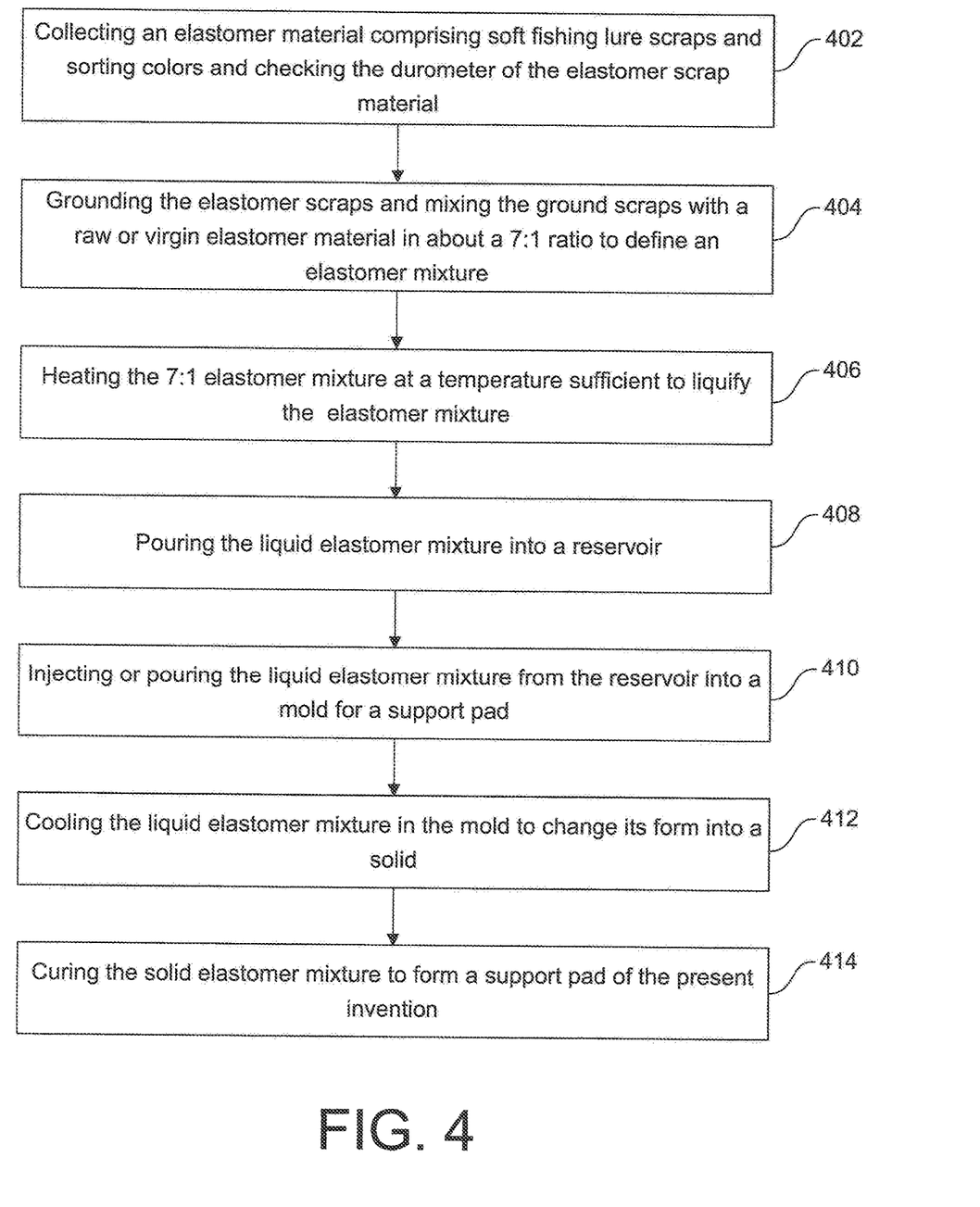
FIG. 4 is one embodiment of a step-by-step method for manufacturing the support pad in accordance with the present invention.

Turning now to FIG. 4, an embodiment of a method of manufacturing a support pad 100 of the present invention may include the steps of collecting an elastomer material, melting the elastomer material at a temperature sufficient to liquify the elastomer material, introducing the liquified elastomer material into a support pad mold, cooling the elastomer material in the mold, and removing the cured support pad from the mold.

Another embodiment of a method of manufacturing a support pad of the present invention comprises the steps of: (1) collecting scraps of an elastomer material 402; (2) grounding the scraps and mixing the scraps with a raw or virgin elastomer material in about a 7:1 ratio to define an elastomer mixture 404; (3) heating the mixture of elastomer material at a pre-defined temperature to liquify the mixture 406; (4) introducing the liquid elastomer mixture into a reservoir 408; (5) introducing, by means of injection or pouring, the liquid elastomer mixture from the reservoir into a mold for a support pad 410; (6) cooling the elastomer mixture in the mold 412; and (7) curing the solid elastomer mixture to from a support pad of the present invention 414.

With regards to step one of collecting scraps of an elastomer material may further include sorting the scraps by colors and durometer. In one embodiment of the present invention, the scraps of elastomer material may include fishing lure scraps. As appreciated by those skilled in the art, during the manufacturing of fishing lures there is a large amount of elastomer material that is wasted from the trimming of the lures removed from the lure molds as well as lures which were not formed properly and therefore rejected.

In one embodiment of the present invention, this elastomer material scraps may comprise plastisol which is generally defined as a suspension of PVC or other polymer particles in a liquid plasticizer. When heated to around 177° C., plastisol generally flows as a liquid and can be poured or injected into a mold. The plastic particles in the plastisol dissolve and the mixture turns into a gel of high viscosity. On cooling of the gel of plastisol below 60° C., a flexible, permanently plasticized solid product results. As in the present invention, the steps of cooling the elastomer mixture and its curing, a support pad may be formed of the shock absorbing material having the characteristics of significantly absorbing impact shocks, vibration and gravitational forces that may act on a battery placed in supportable relationship thereto.

In one embodiment of the present invention, the method of manufacturing the support pad may comprise the step of automatically injecting the liquid elastomer (e.g., pastisol) mixture into a clamped mold through a machine reservoir by sufficient pressure. In another embodiment, the liquid elastomer (e.g., pastisol) mixture may be manually poured into a receiving tray or mold.

While various embodiments of the present invention have been described above, it should be understood that the embodiments have been presented by way of example only and not be limitation. Likewise, the Figures depict examples of the configurations of the various aspects of the invention, which is done to aid in understanding the features and functionality that can be included in the present invention. Moreover, the invention is not restricted to the illustrated examples, where the desired features can be implemented or designed in a variety of alternative configurations sufficient to achieve the intended purposes of the support pad of the present invention.

Consistent with the forgoing, although the invention is described above in terms of various exemplary embodiments and implementations, it should be understood that the various features, aspects and functionality described in one or more of the individual embodiments are not limited in the applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited y any of the above-described exemplary embodiments.

The present invention may be embodied in other specific forms without departing from its fundamental functions or essential characteristics. The described embodiments are to be considered in all respects only as illustrative, and not restrictive. All changes which come within the meaning and range of equivalency of the illustrative embodiments are to be embraced within their scope.

What is claimed and desired to be secured by United States Letters Patent is:

1. A method of manufacturing a support pad for reducing vibration and gravitational shock acting on a battery comprises, comprising the steps of:
   collecting scraps of an elastomer material;
   grounding said scraps and mixing said ground scraps with a raw or virgin elastomer material in about a 7:1 ratio to define an elastomer mixture;
   heating the mixture of elastomer material at a temperature sufficient to liquify the elastomer mixture;
   introducing the liquid elastomer mixture into a reservoir;
   introducing the liquid elastomer mixture in the reservoir into a mold for a support pad;
   cooling the elastomer mixture deposited in the mold; and
   curing the elastomer mixture to form a support pad capable of absorbing energy from an impact shock applied against a battery, transferring a gravitational force that occurs along a z-axis resulting from up and down movement of the battery and dispersing said gravitation force along an x-axis and a y-axis to reduce said impact shock by between about 65% to about 80%.

2. The method as defined in claim 1, further comprising the steps of sorting the scraps of elastomer material by colors and checking the durometer scale of the scraps.

3. The method as defined in claim 1, wherein the elastomer material is plastisol.

4. The method as defined in claim 3, wherein the scraps of elastomer material comprises soft fishing lures.

5. The method as defined in claim 1, wherein introducing the liquid elastomer mixture into the reservoir is performed manually.

6. The method as defined in claim 1, wherein introducing the liquid elastomer mixture into the reservoir is performed by machine.

* * * * *